Patented Dec. 30, 1941

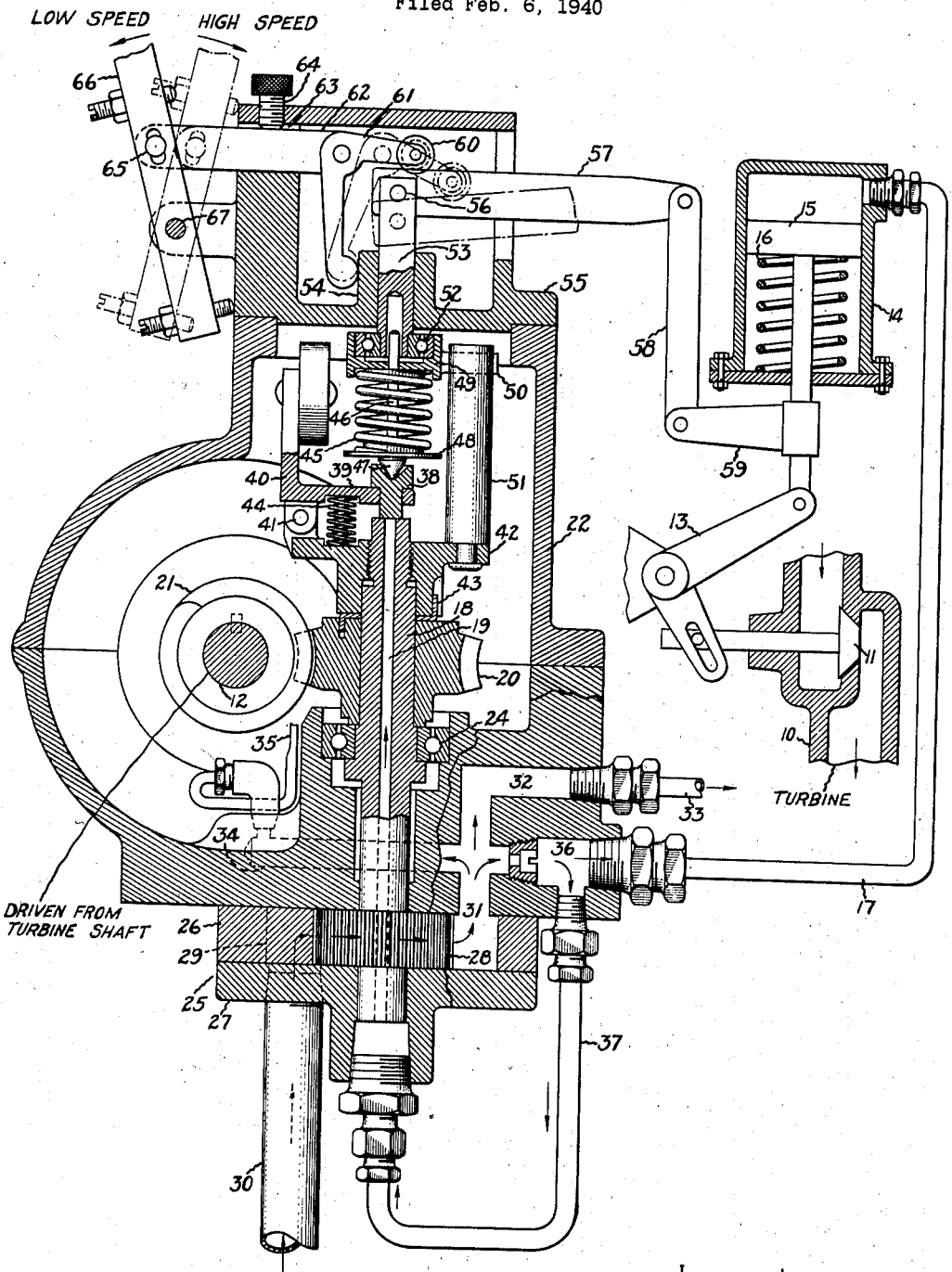

2,268,230

UNITED STATES PATENT OFFICE 2,268,230

GOVERNING MECHANISM

Donald F. Warner, Swampscott, Mass., assignor to General Electric Company, a corporation of New York Application February 6, 1940, Serial No. 317,511

2 Claims. (Cl. 264—3)

The present invention relates to governing mechanisms for controlling a prime mover or the like in response to changes of its operating condition. More particularly the invention relates to the type of mechanisms which include a speed governor or like element responsive to changes of speed or like condition of a prime mover for controlling the pressure of an operating fluid in a servo motor arranged to position a valve or like element to be controlled in response to changes of the speed or like operating condition. Governing mechanisms of this type have a certain regulation permitting a slight change of the condition controlled with changes in load in order to assure stable operation. For example, a turbine speed governing mechanism with a regulation of 4% permits the turbine speed to drop 4% as the turbine load increases from no load to full load. The regulation of the above type of governing mechanism ordinarily varies with changes of the setting of the speed or like condition of the mechanism. Such variations or changes of the regulation with changes of the speed setting are undesirable.

One object of my invention is to provide an improved construction and arrangement of governing mechanisms whereby the regulation of the mechanism may be maintained substantially constant for different settings of the speed governor or like element responsive to the condition to be controlled.

For a consideration of what I believe to be novel and my invention, attention is directed to the following description and the claims appended thereto in connection with the accompanying drawing.

The single figure of the drawing illustrates a sectional view of a speed governing mechanism embodying my invention.

In the present instance I have shown a speed governing mechanism for controlling the inlet valve of an elastic fluid turbine in response to speed changes thereof.

The arrangement comprises a turbine 10 with a controlled element in the form of an inlet valve 11 for controlling the flow of elastic fluid thereto and a rotor driven shaft 12. The turbine inlet valve 11 has a stem connected to an arm of a fulcrumed bell crank 13, the other arm of which is pivotally connected to the stem of a servo motor 14 including a piston 15 biased upward by a compression spring 16 and having an upper end connected to an oil supply pipe 17. The pressure in the oil supply system through the pipe 17 is controlled by means including a speed governor driven from the turbine shaft. More specifically the control mechanism comprises a hollow governor spindle 18 with a central bore 19 rotated by a gear 20 which meshes with a worm 21 on the turbine driven shaft 12. The spindle 18 is supported in a casing 22 which has lower and upper portions secured together. An intermediate portion of the spindle 18 is supported on the casing by a ballbearing 24. The lower portion of the spindle is arranged to drive a positive displacement pump 25. The pump has a casing 26 with a cover 27 secured to the lower portion of the casing 22 and gear means 28 driven from the spindle 18. The gear pump has an inlet side 29 for connection by a conduit 30 to a source of oil or like operating fluid. The pump has a discharge chamber 31 from which a part of the oil is supplied to a channel 32 and a conduit 33 for connection to bearings and other elements requiring oil during operation. Another portion of the oil is conducted from the discharge chamber 31 through a channel 34 to a nozzle 35 for lubricating the aforementioned worm gear 20, 21.

Finally another part of the oil in the discharge chamber 31 is conducted through a restriction or orifice 36 to the aforementioned supply conduit 17 for the servo motor 14 and to a conduit 37 connected to the lower end of the hollow spindle 18. The oil thus conducted to the channel of the spindle is drained from the upper end thereof and the draining is controlled by a valve 38 which latter is moved by a controlling element in response to changes of an operating condition. In the present instance the valve is held on an arm 39 of a single flyweight, centrifugal type speed governor 40. The single flyweight of the governor is pivotally held on a fulcrum 41. The fulcrum 41 forms part of a flanged member 42 screwed to the upper end of the hollow spindle 18 and locked thereon by a locking device 43. Backlash between the flyweight and its fulcrum 41 and the valve 38 is prevented by a compression spring 44 between the member 42 and the arm 39 of the flyweight. The flyweight is loaded against centrifugal force by means of a compressed loading spring 45 surrounding a spindle 46 with a conical lower end 47 engaging a conical recess in the valve 38. The lower end of the spring engages a spring plate 48 on the conical end 47 and the upper end of the spring 45 engages one side of a disk 49 which has a bracket 50 guided on a counterweight 51 having a lower end fastened to the flanged member 42. The counterweight 51 is arranged opposite the single weight of the governor 40, thereby statically balancing the latter.

The upper side of the disk 49 acts as a support for a ballbearing 52 which has an inner, non-rotatable race secured to a stem or rod 53 and an outer rotatable race secured to an upper portion of the aforementioned disk 49. The stem 53 is held by a guide 54 which is secured to and forms part of a cover 55 for the casing 22. The upper end of the stem 53 is connected by a pivot 56 to the left-hand end of a follow-up lever 57. The right-hand end of the lever 57 is connected by a link 58 and a bracket 59 to the stem of the piston 15. An intermediate point of the follow-up lever 57 is held on a fulcrum, in the present instance formed by a roller 60.

With the roller 60 in a fixed position, as indicated in full lines, the operation of the mechanism is as follows: During normal operation the flyweight 40 moves the valve 38 a definite distance from its seat from the upper end of the spindle 18. The valve thereby forms a definite restriction and hence establishes a fixed pressure within the hollow spindle 18, the conduit 37, the conduit 17 and the servo motor 40. If now the speed of the turbine 10 increases, which may be due to decreasing load demand from the turbine, the flyweight 40 by the action of centrifugal force is moved out further against the biasing force of the loading spring 45, thereby opening the valve 38 and reducing the restriction to flow of fluid from the hollow spindle 18. This causes a drop in pressure in the conduits 37 and 17 and accordingly a reduced pressure on the upper side of the piston 15 of the servo motor, causing upward movement of the piston 15 by the action of the spring 16 and movement of the turbine inlet valve 11 towards closing position. Upward movement of the piston stem causes upward movement of the link 58 and counter-clockwise turning movement of the follow-up lever 57 about the fulcrum or roller 60 whereby the left-hand end of the lever 57 is forced downward, causing downward movement of the stem 53 and increased loading of the governor spring 45, thus moving the valve 38 towards its original position. Thus the follow-up action of the governing mechanism is accomplished by changing the loading of the spring 45 in response to movement of the servo motor 15.

The speed fixed by this centrifugal type governor varies in proportion to the square root of the spring loading. The change in speed between no load and full load for a given valve motion varies in percentage inversely to the square of the speed setting. Thus, if at top speed the governor has a regulation of 8% for ¼" valve travel, then the regulation for the same valve travel at half speed would be 32%. Such wide change of regulation with change in speed setting is undesirable and this change in regulation is overcome in accordance with my invention by the provision of means for varying the follow-up action of the lever 57 in response to changes of the speed setting.

The speed setting, as pointed out above, is accomplished by changing the compression of the loading spring 45, and the follow-up action of the lever 57 in the present instance is accomplished by the provision of means for moving the fulcrum or roller 60 in response to changes of the loading of the spring 45. To this end the roller 60 is supported on an arm of a bellcrank 61, the other arm of which engages the outer surface of the guide 54. The bellcrank is pivotally held on a lever 62 projecting through an opening 63 in the cover 55 and normally held in position by a set screw 64. The outer end of the lever 62 is connected by a pivot 65 to an actuating rod 66 held on a fixed fulcrum 67 on the cover 55. The arrangement is indicated in two positions, a low speed position in full lines and a high speed position in dash-dotted lines. Movement of the actuating rod 66 in clockwise direction causes the roller 60 to move towards the right on the lever 57, thereby changing the follow-up action of the latter and also causing the roller together with the lever 57 to be forced downward, thereby changing the loading of the spring 45, that is, the speed setting of the governor. Thus, with my invention I have accomplished an improved construction and arrangement of governing mechanisms which include means for automatically changing the follow-up action in response to changes of the speed setting. In this manner the regulation of a governing mechanism may be maintained substantially constant for widely varying speed settings.

Having described the method of operation of my invention together with the apparatus which I now consider to represent the best embodiment thereof, I desire to have it understood that the apparatus shown is only illustartive and that the invention may be carried out by other means.

What I claim as new and desire to secure by Letters Patent of the United States is:

1. A speed governing mechanism comprising a centrifugal type speed governor, means including a hollow spindle for supporting the governor and rotating it from a prime mover to be controlled, a servo motor, a system for supplying fluid under pressure to the motor, means controlling the fluid pressure comprising a channel formed by the hollow spindle defining a discharge for fluid from the system, a valve member held by the governor for varying the discharge of fluid from the channel, a loading spring for the governor, a follow-up mechanism for varying the spring loading in response to movement of the motor, and means for setting the speed of the mechanism and simultaneously controlling its regulation to maintain a predetermined regulation within a wide range of speed.

2. A speed governing mechanism comprising a centrifugal type speed governor, means including a hollow spindle for rotating the governor in response to speed changes of a prime mover to be controlled, a servo motor, a system for supplying operating fluid under pressure to the motor, means controlling the fluid pressure comprising the channel formed by the hollow spindle defining a discharge for fluid from the system, a valve member held by the governor for varying the discharge of fluid from the channel in response to speed changes, a loading spring for the governor, a follow-up mechanism for varying the spring loading in response to movement of the motor, said follow-up mechanism including a lever and a roller forming a fulcrum for the lever, and means including a belicrank supporting the roller and an adjusting rod for the bellcrank for simultaneously adjusting the fulcrum and changing the loading of the spring.

DONALD F. WARNER.